US012347260B2

(12) United States Patent
Sirbu Villa

(10) Patent No.: US 12,347,260 B2
(45) Date of Patent: Jul. 1, 2025

(54) CUP HOLDER FOR A BEVERAGE VENDING MACHINE

(71) Applicant: EVOCA S.P.A., Milan (IT)

(72) Inventor: Dan Alexie Sirbu Villa, Milan (IT)

(73) Assignee: EVOCA S.P.A., Milan (IT)

( * ) Notice: Subject to any disclaimer, the term of this patent is extended or adjusted under 35 U.S.C. 154(b) by 525 days.

(21) Appl. No.: 17/768,566

(22) PCT Filed: Oct. 19, 2020

(86) PCT No.: PCT/IB2020/059822

§ 371 (c)(1),
(2) Date: Apr. 13, 2022

(87) PCT Pub. No.: WO2021/074911

PCT Pub. Date: Apr. 22, 2021

(65) Prior Publication Data

US 2023/0177909 A1 Jun. 8, 2023

(30) Foreign Application Priority Data

Oct. 18, 2019 (EP) .................................... 19204194
Oct. 16, 2020 (IT) ........................ 102020000024493
Oct. 16, 2020 (IT) ........................ 102020000024496

(51) Int. Cl.
*G07F 13/10* (2006.01)

(52) U.S. Cl.
CPC .................................. *G07F 13/10* (2013.01)

(58) Field of Classification Search
CPC .............................. G07F 13/10; B25J 15/0052
See application file for complete search history.

(56) References Cited

U.S. PATENT DOCUMENTS 3,120,324 A 2/1964 Amberg et al.
4,426,017 A * 1/1984 Ficken ................ B65G 59/102
221/241

(Continued)

FOREIGN PATENT DOCUMENTS

EP 0462591 A1 12/1991
EP 1575006 A1 * 9/2005 ............ G07F 13/10

(Continued)

OTHER PUBLICATIONS

First Office Action for Chinese Application No. 202080088018.5 mailed May 31, 2024.

(Continued)

*Primary Examiner* — Timothy P. Kelly
(74) *Attorney, Agent, or Firm* — Dorsey & Whitney LLP

(57) ABSTRACT

A cup holder designed to be mounted in a beverage vending machine to support an individual cup in a filling station and/or in a picking station; the cup holder having a vertical axis and comprising a frame and a cup retention device, which is supported by the frame and defines a cup retention area designed to be occupied by a cup when the cup is supported by the cup retention device. The cup holder further comprises an electric actuator, which is kinematically coupled to the cup retention device to move the cup retention device, thus adapting the dimension of the cup retention area to the dimension of the cup, and is mounted on the frame via a quick engagement/disengagement device configured to enable the electric actuator to be easily and quickly mounted and dismounted, with a few simple operations, on/from the rest of the cup holder.

16 Claims, 8 Drawing Sheets

(56) References Cited

U.S. PATENT DOCUMENTS

| | | | | |
|---|---|---|---|---|
| 5,518,149 | A * | 5/1996 | Lotspeich ............... | G07F 13/10 221/241 |
| 2011/0089709 | A1* | 4/2011 | Neeper ..................... | B66C 1/44 294/119.1 |
| 2018/0225907 | A1* | 8/2018 | Van Den Driessche ..................... | B65G 59/108 |

FOREIGN PATENT DOCUMENTS

| | | | | |
|---|---|---|---|---|
| EP | 1974328 | A1 | 10/2008 | |
| EP | 2369559 | A1 | 9/2011 | |
| EP | 3576056 | A1 * | 12/2019 | ........... B65G 59/102 |
| WO | 2014115073 | A1 | 7/2014 | |
| WO | 2017158555 | A1 | 9/2017 | |

OTHER PUBLICATIONS

International Preliminary Report on Patentability for International Application No. PCT/IB2020/059822 mailed Jan. 26, 2022.

International Search Report and Written Opinion from International Application No. PCT/IB2020/059822 mailed Feb. 15, 2021.

Reply to Written Opinion for International Application No. PCT/IB2020/059822 filed Aug. 12, 2021.

Second Written Opinion from International Application No. PCT/IB2020/059822 mailed Nov. 5, 2021.

* cited by examiner

CUP HOLDER FOR A BEVERAGE VENDING MACHINE

CROSS-REFERENCE TO RELATED APPLICATIONS

This patent application is a U.S. national stage of PCT International Application No. PCT/IB2020/059822 filed on 19 Oct. 2020, which claims priority to European patent application No. 19204194.5 filed on 18 Oct. 2019, and Italian patent application No. 102020000024493 and No. 102020000024496 filed on 16 Oct. 2020, the entire disclosures of which are incorporated herein by reference.

TECHNICAL FIELD OF THE INVENTION

The present invention concerns a cup holder, which finds advantageous although not exclusive application in beverage vending machines, to which the following description will refer without loss of generality.

STATE OF THE ART

In the vending sector it is known to arrange a cup dispenser inside a beverage vending machine to feed individual cups to a cup filling station, where the individual cups are filled with a beverage and, if necessary, sugar and stirring blades.

In general, a cup dispenser comprises a tower or carousel magazine comprising a rotatable support mounted to rotate about a vertical axis and a plurality of tubular containers mounted on the support around the vertical axis and designed to contain respective stacks of cups. In use, the support is rotated about the vertical axis so as to place, one at a time, the tubular containers in a cup release station, in which a cup disengagement device detaches an individual cup from the bottom of the stack and lets it drop, appropriately guided by a chute, into a cup holder from which, once filled with the beverage, the cup is manually removed by the user.

Normally, each tubular container is equipped with a respective cup disengagement device, while the cup holder is single and common to all the tubular containers and can be either stationary in the filling station or movable between a cup receiving point and the cup filling station.

The need to deliver cups of different dimensions has resulted in the manufacturers equipping the tower magazine with tubular containers of various diameters and to use adjustable disengagement devices so as to allow the dimension thereof to be modified according to the dimension of the cups contained in the corresponding tubular containers.

The possibility of dispensing cups of different dimensions has consequently also resulted in the need for a cup holder able to receive and securely hold cups of different dimensions.

The solutions currently known have solved this problem substantially in two ways, applicable alternatively or in combination: equipping the vending machine with cup holders of different dimensions and/or use one cup holder having a shape, generally a funnel shape, enabling it to hold cups of various dimensions.

The first type of solution is disclosed, for example, in EP 2 369 559 A1 and suffers from the drawback of being too bulky due to the space occupied by the cup holders and above all the space required for the movement thereof.

The second type of solution is disclosed, for example, in EP 1 974 328 A1 and suffers from the drawback of providing the cups, when in the cup holder, with less stability than the cup holders with a shape designed to couple only with a cup of a given dimension. Furthermore, the range of cup dimensions receivable by the cup holder is fairly limited.

Another problem with the cup holders is the routine maintenance thereof. The cup holders require frequent cleaning by the operators since, as is natural in view of their function, in use they are easily reached by splashes of beverage that rebound outside the cups when the latter are filled. The problem of the need for frequent cleaning of the cup holder results from the fact that, in general, in-depth cleaning of the cup holder would require it to be removed and completely washed with water. This operation, however, is often fairly complex due to the presence, on the cup holder, of electrical parts, for example the actuators designed to move the cup holder and, for this reason, the cup holder normally undergoes superficial cleaning limited to the parts that can be reached by the operator without having it to be removed from the cup holder, with unsatisfactory results in terms of hygiene.

SUBJECT AND SUMMARY OF THE INVENTION

The object of the present invention is to provide improvements that remedy the above-described drawbacks.

According to the present invention a cup holder for a beverage vending machine is provided, as claimed in the appended claims.

DETAILED DISCLOSURE OF PREFERRED EMBODIMENTS OF THE INVENTION

Figure 1:
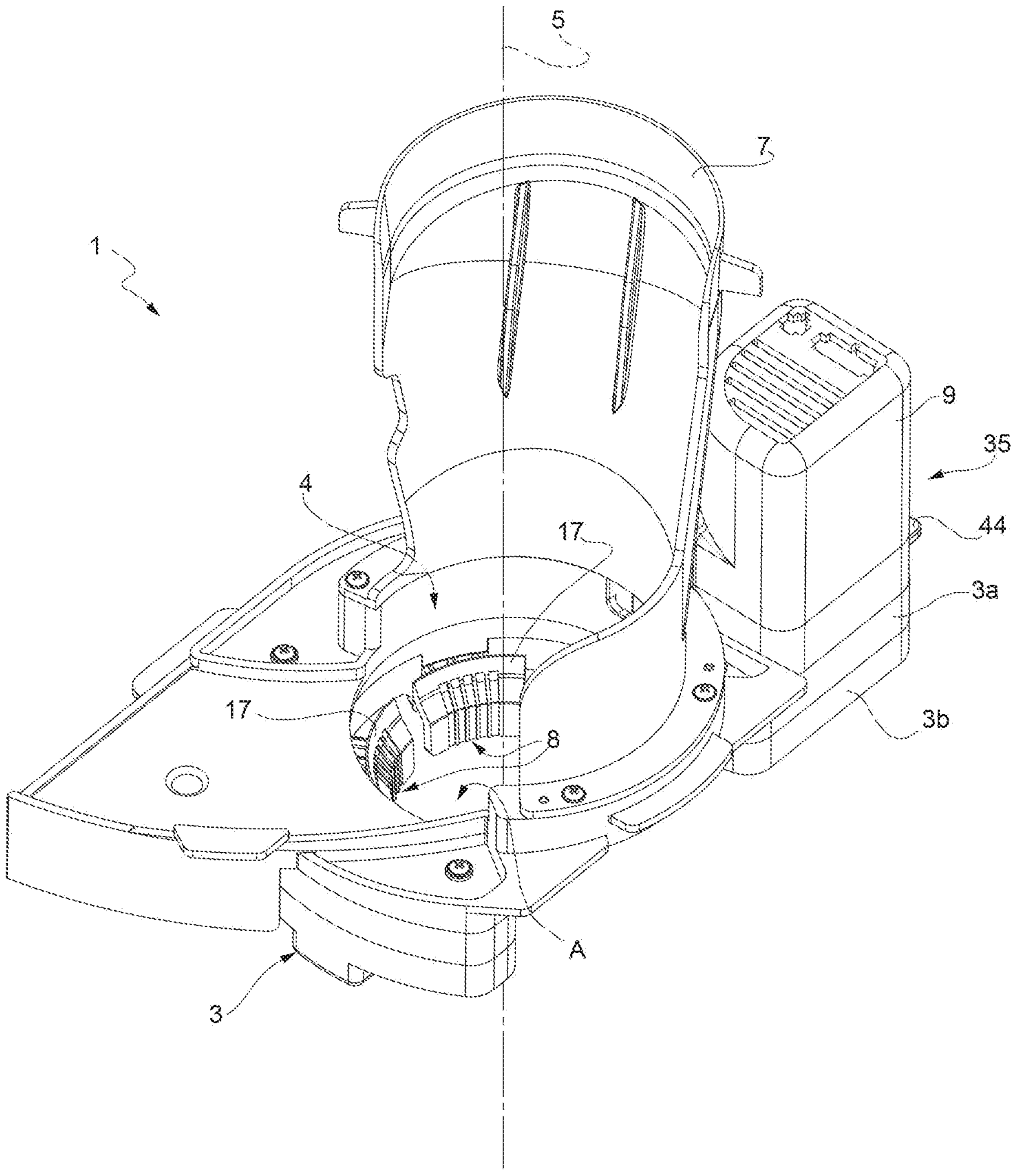
FIG. 1 is a perspective top view of a cup holder for a beverage vending machine according to a preferred embodiment of the invention.
Figure 2:
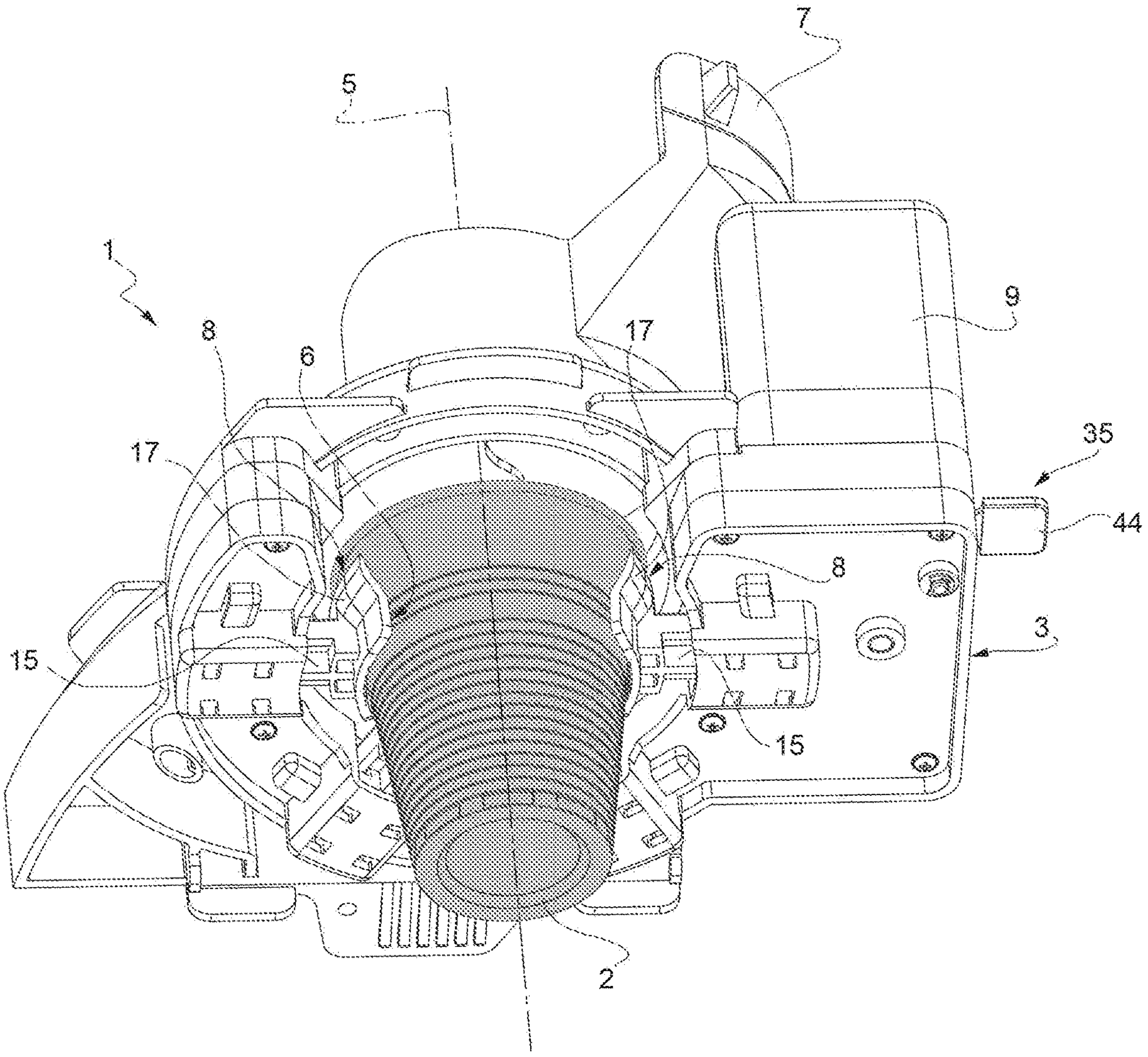
FIG. 2 is a perspective view from below of the cup holder of FIG. 1.
Figure 3:
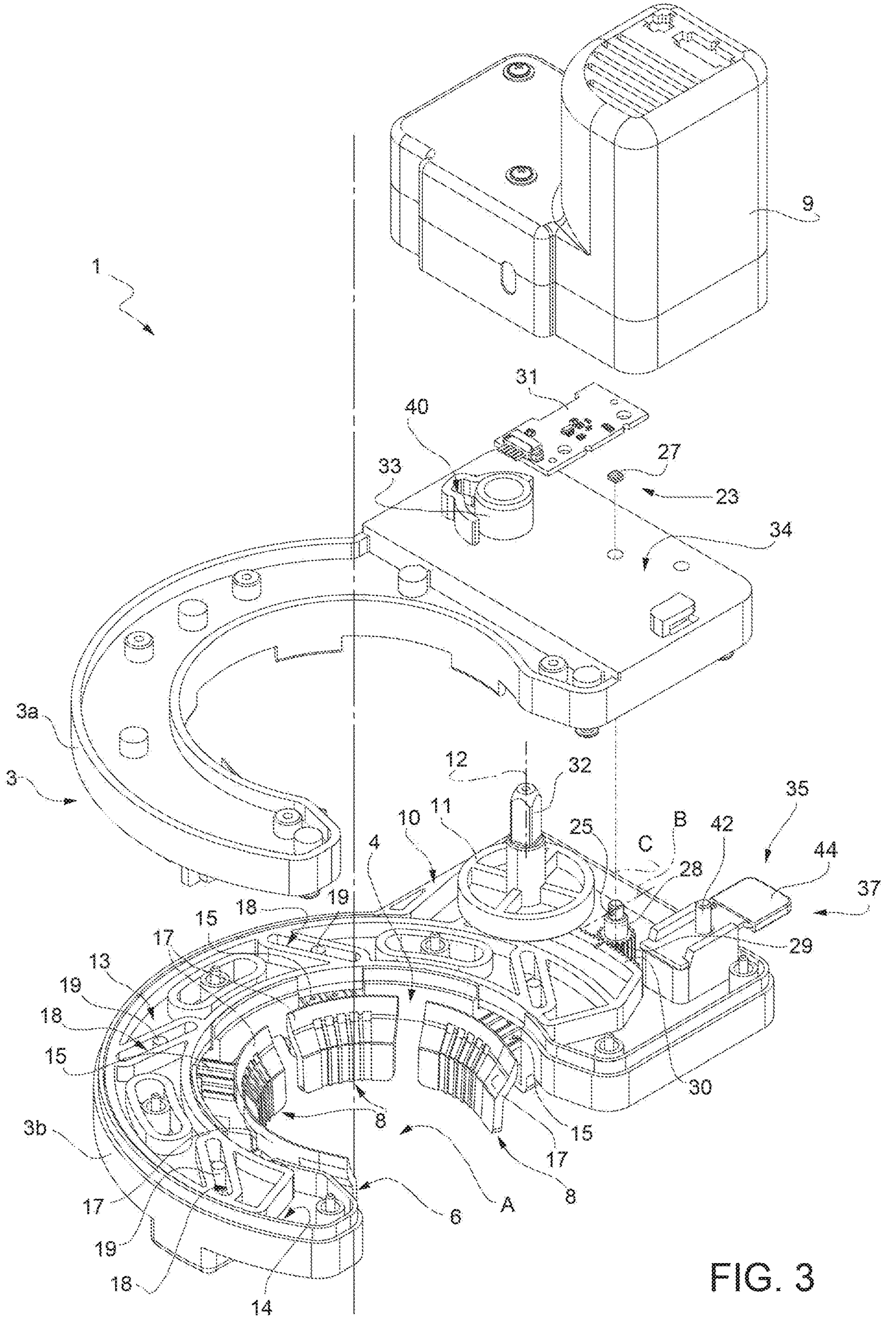
FIG. 3 is an exploded view, with parts removed for clarity, of the cup holder of FIG. 1.

The present invention will now be described in detail with reference to the attached figures to enable a person skilled in the art to produce it and use it. Various modifications to the embodiments described will be immediately evident to persons skilled in the art and the general principles described can be applied to other embodiments and applications without departing from the protective scope of the present invention, as defined in the attached claims. Therefore, the present invention shall not be considered limited to the embodiments described and illustrated, but shall be given the widest protective scope in accordance with the characteristics described and claimed.

Where not defined otherwise, all the technical and scientific terms used here have the same meaning commonly used by persons of ordinary experience in the field of the present invention. In the event of conflict, the present description, including the definitions provided, will be binding. Furthermore, the examples are provided for purely illustrative purposes, and as such shall not be considered limiting.

In order to facilitate understanding of the embodiments described here, reference will be made to some specific embodiments and a specific language will be used to describe them. The terminology used in the present document has the purpose of describing only particular embodiments, and is not intended to limit the scope of the present invention.

In the attached Figures, the number 1 indicates overall a cup holder for a beverage vending machine (not shown).

The cup holder 1 is normally arranged in a cup filling station and is associated with a cup dispenser, for example of the type described and shown in WO 2017/158555 A1 in the same of the present Applicant, to receive from the cup dispenser an individual cup 2 at a time and hold the cup 2 below one or more nozzles arranged for dispensing ingredients of the beverage.

Normally, the cup filling station coincides with a cup picking station where the cup 2 filled with the beverage is picked-up by a user and, for this purpose, the cup holder 1 is so shaped as to allow the cup 2 to be transversally slid out of the cup holder. According to a variation, the cup picking station does not coincide with the cup filling station and the cup holder 1 is mounted to move between the cup filling station and the cup picking station.

The cup holder 1 comprises a frame 3 so shaped as to define a cup dropping channel 4 with a vertical axis 5. Preferably, the cup dropping channel 4 has, at least at a lower end portion thereof, a longitudinal opening, preferably with an angular width of approximately 90°.

The cup holder 1 further comprises a slide 7 mounted on the frame 3 and designed to receive, in use, a cup 2 from the cup dispenser and feed the cup 2 to an inlet of the cup dropping channel 4 in a position centred as far as possible relative to the axis 5.

Lastly, the cup holder 1 comprises a cup retention device which is arranged in the cup dropping channel 4, expediently at the outlet thereof, to retain the cup 2 which is fed to the cup dropping channel 4 each time.

The cup retention device comprises a plurality of cup retention members 8 which define therebetween a retention area A coaxial to the axis 5 and designed to be occupied by the cup 2 when the latter is supported by the cup retention members 8.

The cup retention members 8 are slidably mounted on the frame 3 to slide in respective radial directions relative to the axis 5, so as to widen or reduce the retention area A according to the dimension of the cup 2 to be held.

In order to move the cup retention members 8, the cup holder 1 comprises an electric actuator 9 and a transmission 10 designed and arranged to transform a rotary motion from the electric actuator 9 into a simultaneous linear motion of the cup retention members 8 along the respective radial directions.

As shown in the attached figures, the frame 3 comprises an upper half-shell 3*a* and a lower half-shell 3*b* mutually coupled and the electric actuator 9 is a gear-motor mounted on the upper half-shell 3*a*.

The transmission 10 is housed between the upper half-shell 3*a* and the lower half-shell 3*b* and preferably comprises a crank and slotted link in which the rotation, clockwise or anticlockwise, of a wheel 11 around a rotation axis 12 parallel to the axis 5 is transmitted to an oscillating member 13, which is mounted to oscillate around the axis 5 in response to a rotation of the wheel 11 and is kinematically coupled to the cup retention members 8 so as to transform its own oscillatory motion around the axis 5 into a reciprocating rectilinear motion of the cup retention members 8 along the respective radial directions.

In particular, the oscillating member 13 that controls the radial sliding movement of the cup retention members 8 is defined by a circular arc-shaped sector, which is coaxial to the axis 5, extends on a plane perpendicular to the axis 5 and slidably engages a curvilinear guide 14 formed in the frame 3, in particular in the lower half-shell 3*b*, and coaxial to the axis 5.

Preferably, the oscillating member 13 is guided in its rotary movement around the axis 5 also by a plurality of slider carried by the lower half-shell 3*b* and slidably engaging respective curvilinear slots formed in the oscillating member 13.

The cup retention members 8 are mounted on the oscillating member 13 and are distributed, preferably evenly, along an arc of approximately 270° so as to define, between the two cup retention members 8 arranged at the free ends of the oscillating member 13, an opening corresponding, and having similar range, to the above-mentioned longitudinal opening of the cup dropping channel 4.

Figure 4:
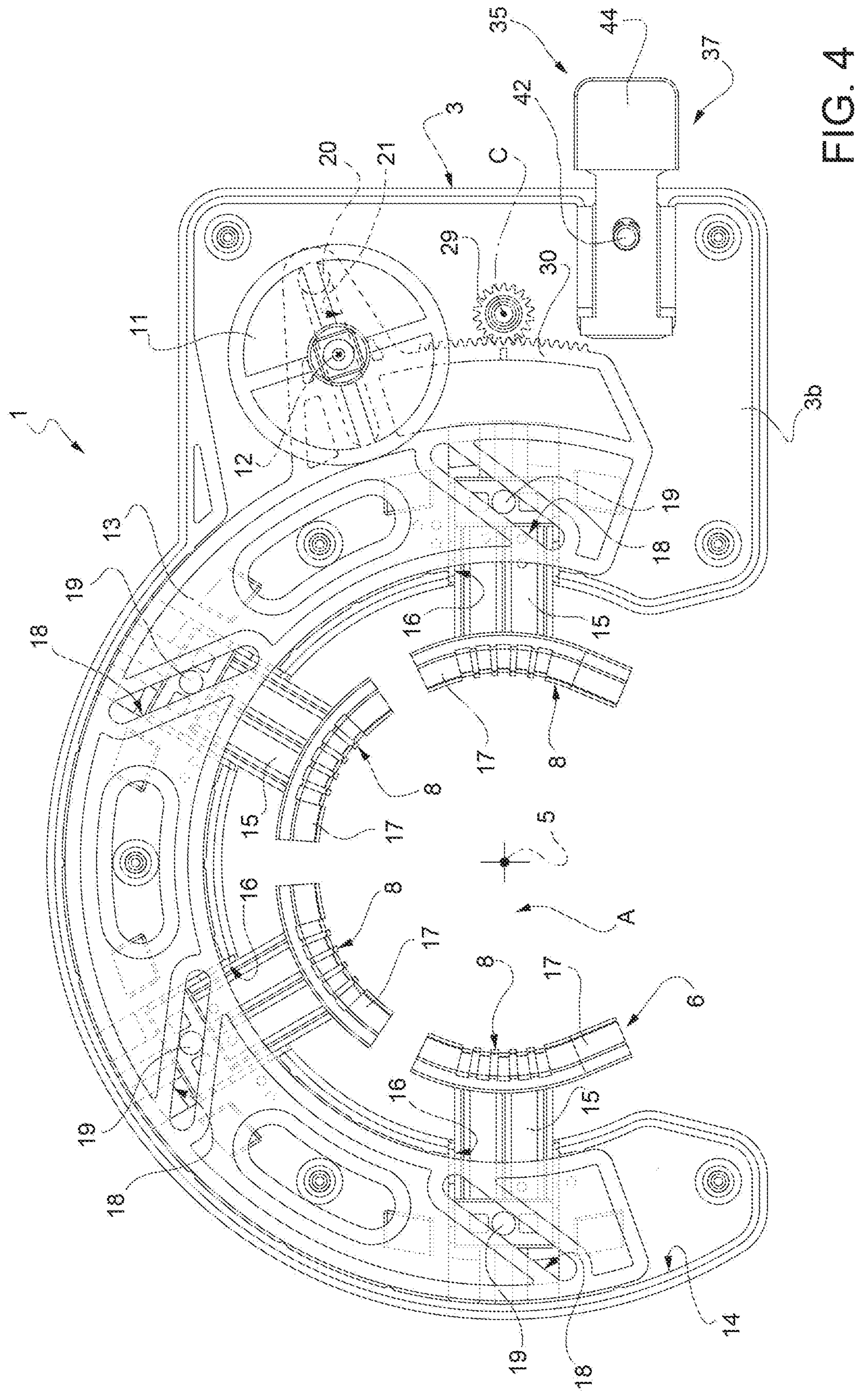
FIG. 4 illustrates in plan view a detail of FIG. 3.
Figure 5:
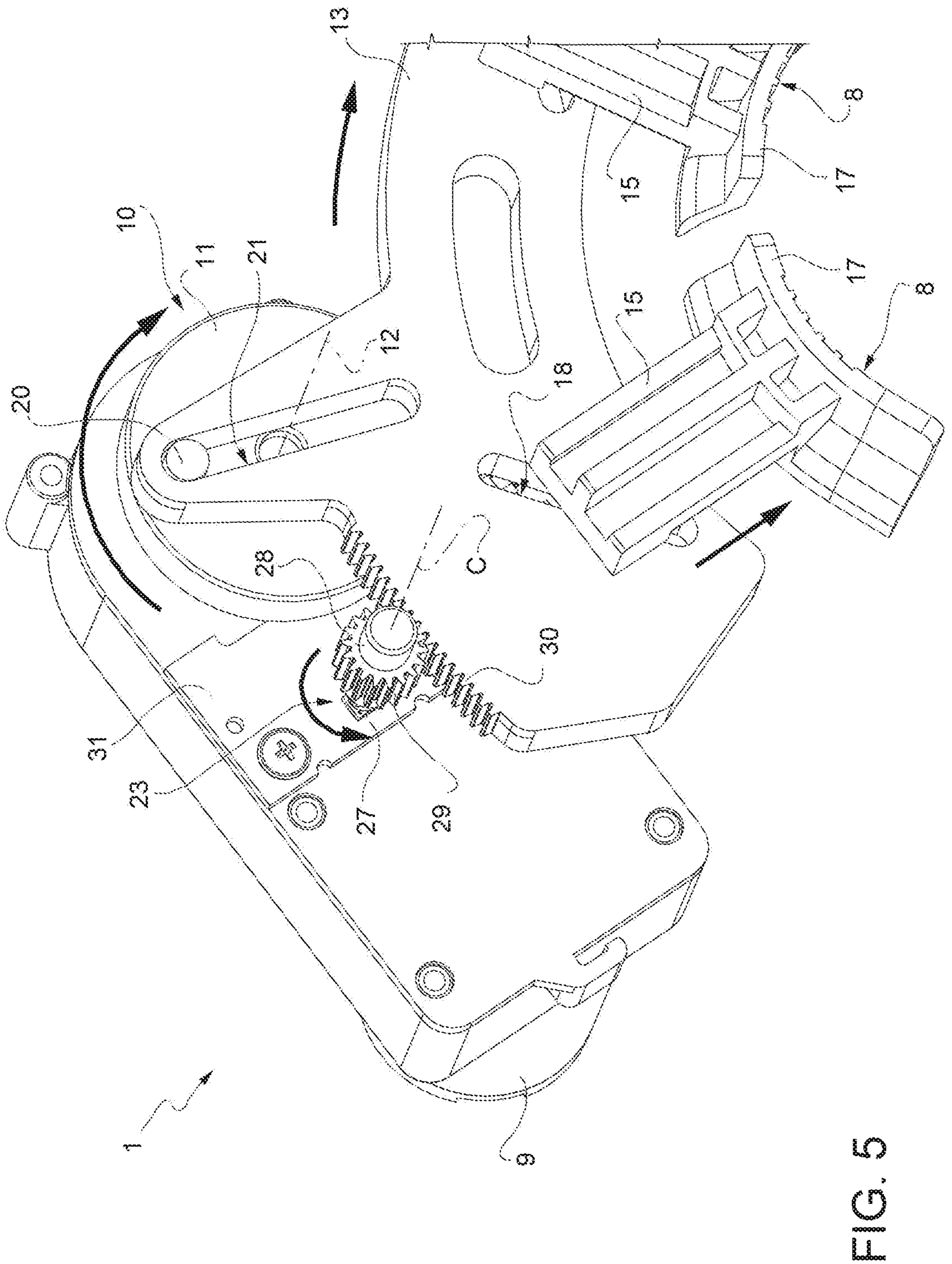
FIG. 5 is a perspective view from below, on an enlarged scale and with parts removed for clarity, of a detail of FIG. 1.
Figure 6:
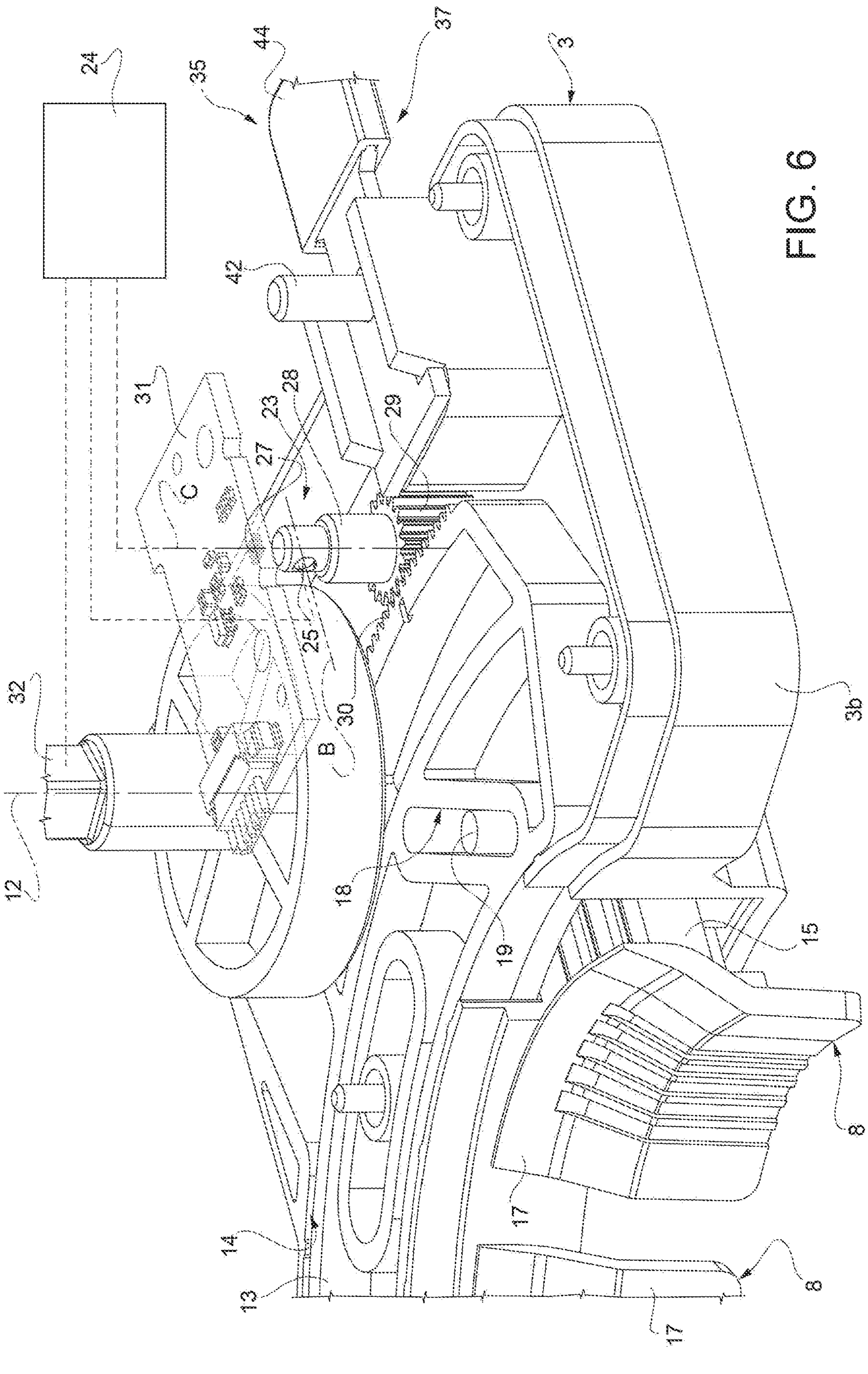
FIG. 6 is a perspective top view, on an enlarged scale with parts removed for clarity, of a detail of FIG. 1.

As shown in FIGS. 4 and 5, each cup retention member 8 comprises a guide sliding block 15, which radially extends relative to the axis 5 and slidably engages a respective track 16 formed in the frame 3, in particular in the lower half-shell 3*b*.

Each cup retention member 8 further comprises a circular arc-shaped cup engaging portion 17, which is connected to the radially internal end of the relative guide sliding block 15 and bounds, with the other cup engaging portions 17, the above-mentioned retention area A.

The oscillating member 13 controls the cup retention members 8 via a cam mechanism. For this purpose, the oscillating member 13 is provided with longitudinal slots 18, each of which is arranged facing a corresponding guide sliding block 15 and is slidably engaged by a relative follower or pin 19 carried by the respective guide sliding block 15.

The slots 18 are oriented, relative to the radial direction, so that, in response to a rotation of the oscillating member 13 around the axis 5, the cup retention members 8 are moved radially from or towards the axis 5 according to the rotation direction of the oscillating member 13.

The oscillating member 13 is moved by the wheel 11 by means of a pin-slot coupling designed, as said, to transform a continuous rotation of the wheel 11 into a reciprocating oscillatory movement of the oscillating member 13 around the axis 5 and, through the oscillation of the oscillating member 13, into a radial translation of the cup retention members 8.

As illustrated in FIGS. 3, 4, 5 and 7, the wheel 11 is carried by the lower half-shell 3*b* and is kinematically connected by means of a shaft 32 to an output 9*a* of the electric actuator 9 arranged on a bottom wall of a casing of the electric actuator 9.

In particular, the shaft 32 is integral with the wheel 11 and extends upwards, from the centre of the wheel 11 and parallel to the axis 5, through an upper wall 34 of the upper half-shell 3*a* until it engages a bush 33 coaxial to the axis 12.

A free end of the shaft 32 has a prismatic shape and protrudes from the bush 33 to engage the output 9*a* of the electric actuator 9, thus angularly coupling the latter with the wheel 11 and transmitting the motion to the oscillating member 13.

On the opposite side to the shaft 32, the wheel 11 carries an offset pin 20 parallel to the axes 5 and 12 and slidably engaged in a rectilinear slot 21 formed in the oscillating member 13.

According to a different embodiment (not shown), the oscillating member 13 is not defined by an circular arc-shaped sector, but by a circular ring coaxial to the axis 5, and the cup retention members 8 are distributed throughout the oscillating member 13 so as to hold the cup 2 along the entire circumference of the cup 2. In this case, therefore, the opening 6 is absent and the cup 2 is not manually removed by a user directly from the cup holder 1, but released onto a surface of a cup picking compartment by radially opening the cup retention members 8. Expediently, in this embodiment, the cup holder 1 can be provided with at least one movement in a direction parallel to the axis 5 so that it can be raised and lowered to allow the cup 2 filled with beverage to be more easily released onto the rest surface of the cup picking compartment.

Figure 7:
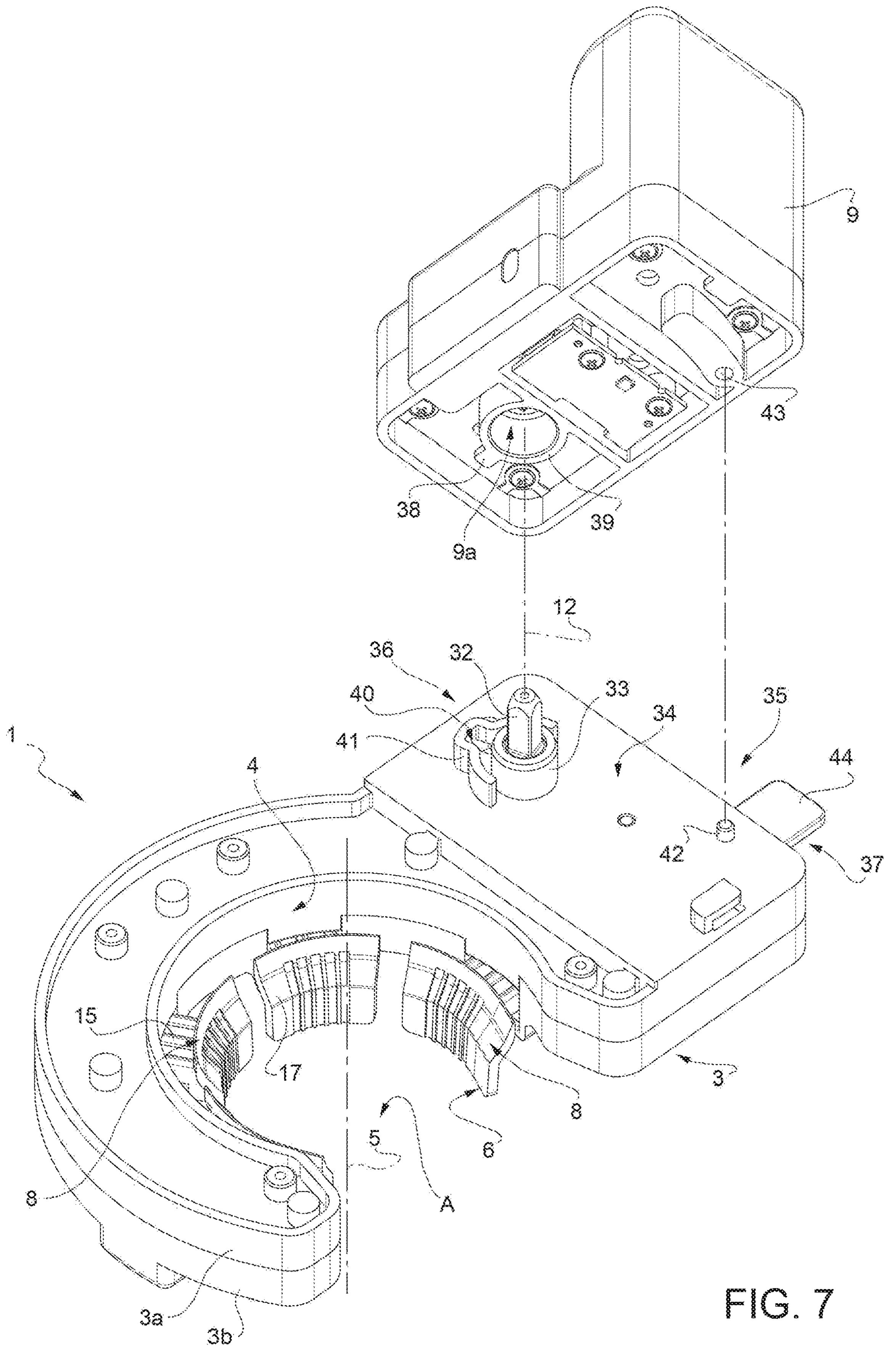
FIG. 7 is an exploded view of a detail of FIG. 1.
Figure 8:
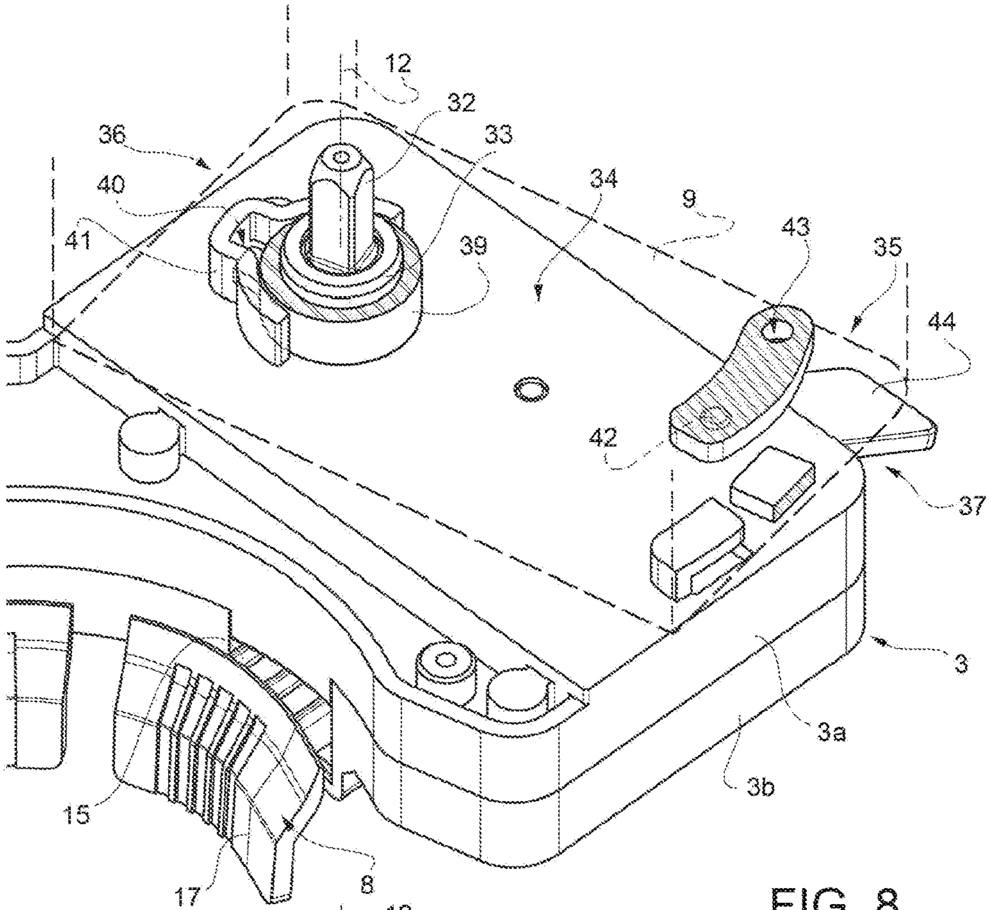
FIGS. 8 and 9 illustrate, on an enlarged scale and with parts removed for clarity, the detail of FIG. 7 in different mounting positions.
Figure 9:
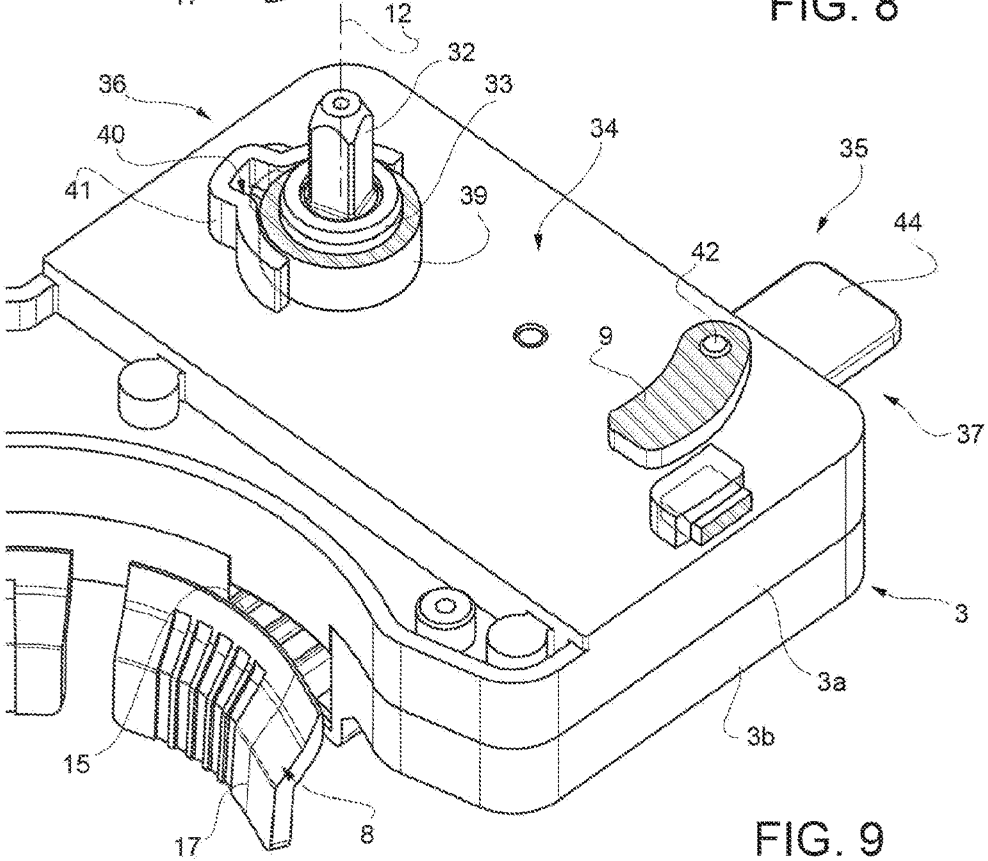

As shown in FIGS. 7, 8 and 9, the electric actuator 9 is mounted on the half-shell 3*a* by means of a quick engagement/disengagement device 35 designed to allow the electric actuator 9 to be easily and quickly mounted and dismounted in a few simple operations, thus enabling an operator to detach from the cup holder 1 the part thereof containing the electric components and wash the remainder part of the cup holder 1 with water without any risk of damaging it.

According to the preferred embodiment shown, the quick engagement/disengagement device 35 comprises a bayonet coupling 36 and a lever release mechanism 37 configured to be manually operated by an operator and move from a locking configuration, in which it prevents removal of the actuator 9 from the frame 3, to a release configuration, in which it allows an operator to move the electric actuator 9 relative to the frame 3 in such a way as to disengage the bayonet coupling 36 and completely detach the electric actuator 9 from the frame 3.

According to the preferred embodiment shown, the bayonet coupling 36 comprises a lug 38 protruding transversally from an outer surface of a sleeve 39, which protrudes from the bottom wall of the electric actuator 9, surrounds the output 9*a* and, when the electric actuator 9 is mounted on the frame 3, is coaxial to the axis 12 and fits freely on the bush 33.

The bayonet coupling 36 further comprises an L-shaped groove 40 carried by the frame 3 and shaped so as to be crossed by the lug 38 during mounting and dismounting of the electric actuator 9 to cause the bayonet coupling 36 to be locked and, respectively, unlocked.

In particular, the groove 40 is bound by a projection 41 protruding from the wall 34 of the half-shell 3*a* close to the bush 33 and so shaped as to define a vertical segment of the groove 40 designed to be crossed by the lug 38 as a result of a movement of the electric actuator 9 in a direction parallel to the axis 12, and a horizontal segment of the groove 40 designed to be crossed by the lug 38 as a result of a rotation of the electric actuator 9 around an axis parallel to the axis 12.

As shown in FIGS. 8 and 9, the lever release mechanism 37 comprises a pin 42, which is slidably mounted through the wall 34 in a direction parallel to the axis 12 and, when the electric actuator 9 is mounted on the frame 3, engages a hole 43 in the bottom wall of the actuator 9.

The lever release mechanism 37 further comprises an actuation lever 44 which extends transversally to the pin 42 and is expediently coupled, in particular is rigidly connected, to the pin 42 so as to drive the pin 42 in response to manual operation of the actuation lever 44 by an operator.

In particular, the actuation lever 44 can be manually moved from a normal rest position, in which the actuation lever 44 is kept by a spring (not shown) in a raised position and the pin 42 protrudes beyond the upper surface of the wall 34 and engages the hole 43, to a release position, in which the actuation lever 44 is lowered to such an extent as to cause the pin 42 to fail to protrude beyond the upper wall 34 so as to free the hole 43 and result in the electric actuator 9 being removable as a result of the disengagement of the bayonet coupling 36, i.e., as a result of a rotation of the electric actuator 9 suitable to move the lug 38 along the horizontal segment of the groove 40 and a translation of the electric actuator 9, in a direction parallel to the axis 12, suitable to move the lug 38 along the vertical segment of the groove 40 until complete detachment of the electric actuator 9 from the frame 3.

To remount the electric actuator 9 on the frame 3 it is not essential for the operator to re-set the actuation lever 44 to the release position since it is sufficient for the electric actuator 9 to be oriented so as to align the lug 38 with the vertical segment of the groove 40 and moved to the wall 34.

The bottom wall of the electric actuator 9 is shaped so that when the electric actuator 9 is moved to the wall 34 to move the lug 38 along the vertical segment of the groove 40, a portion of the wall 34 comes into contact with the pin 42 and lowers it so that the latter does not interfere with the subsequent rotation of the electric actuator 9 to move the lug 38 along the horizontal segment of the groove 40.

The horizontal segment of the groove 40 is sized so that, when the lug 38 reaches stroke end and the bayonet coupling 36 is in the locking position, the pin 42 is aligned with the hole 43 and engages it under the thrust of the spring (not shown) which re-sets the actuation lever 44, and with it the pin 42, to the rest position.

The cup holder 1 further comprises an electronic control system 22 to control operation of the cup holder 1 configured to determine an initial configuration of the cup holder 1 when the latter is installed, and to adjust, in use, the dimension of the retention area A so as to adapt it to the dimension of the cup 2 to be used, and to dynamically correct the positioning of the cup retention members 8 in order to compensate for any offsets that may occur after a certain period of use for various reasons, for example wear or dirt.

In the embodiment in which the oscillating member 13 has the shape of a circular ring, the electronic control system 22 is further configured to operate the cup retention members 8 to cause them to assume a configuration in which a cup 2 filled with beverage is released onto a supporting surface of the cup picking compartment and to bring the cup retention members 8 to a cup retaining configuration in which an empty cup 2 is retained.

The electronic control system 22 comprises:

a sensory system 23 mounted and configured to output an electric output such as to allow a dimension of the retention area A to be determined, and an electronic control unit 24 electrically connected to the sensory system 23 to receive the electric output thereof, and to the electric actuator 9 to provide electric control signals thereto, and programmed to control, based on the electric output of the sensory system 23, the electric actuator 9 so as to adapt the dimension of the retention area A to the dimension of the cup 2 to be used for containing the selected beverage.

In particular, the sensory system 23 comprises a magnetic angular position sensor device 27 mounted and designed to output an electric output indicative of the absolute angular position of the oscillating member 13 and, consequently, of the absolute radial position of the cup retention members 8.

For this purpose, the magnetic angular position sensor device 27 comprises:

an axially magnetized permanent magnet 25 with a magnetization axis B and mounted to rotate about a rotation axis C orthogonal to, and passing through, the magnetization axis B of the permanent magnet 25 in response to a rotation of the oscillating member 13, and a magnetic angular position sensor 26 arranged in a fixed position close to the permanent magnet 25 so as to output an electric output, preferably of a digital type, indicative of the angular position of the magnetic field generated by the permanent magnet 25.

The permanent magnet 25 is expediently a cylindrical magnet carried by a shaft 28 of a gear 29 mounted on the frame 3 to rotate about a rotation axis C, which is parallel to the axis 5, and meshing with a toothed sector 30 formed along an edge of the oscillating member 13.

The permanent magnet 25 is inserted in a hole formed at a free end of the shaft 28 facing the magnetic angular position sensor 26 and having an axis perpendicular to the rotation axis C and coinciding with the magnetization axis B.

The magnetic angular position sensor 26 is mounted on a printed circuit board 31 housed in a fixed position inside the casing of the electric actuator 9, and is arranged aligned with the rotation axis C.

The gear 29 comprises a plurality of teeth with constant pitch. In one possible embodiment, the gear 29 comprises 18 teeth with pitch of 20°. In different embodiments, the gear 29 could comprise a number of teeth higher or lower than 18, so as to have a pitch lower or greater than 20°.

Since the number of teeth of the gear 29 determines a corresponding number of possible discrete angular positions in which the gear 29 can be randomly coupled with the toothed sector 30 of the oscillating member 13 when the cup holder 1 is mounted, the electronic control unit 24 is programmed to determine an initial configuration of the cup holder 1 when it is mounted, defined by the initial dimension of the retention area A when the cup holder 1 is mounted.

For this purpose, in one embodiment the electronic control unit 24 is programmed to:

determine, based on the electric output of the magnetic angular position sensor 26, the current absolute angular position of the permanent magnet 25, energize the electric actuator 9 until, based on the current absolute angular position of the permanent magnet 25, the electronic control unit 24 detects:

a first rotation direction inversion of the permanent magnet 25, which is caused by an inversion in the oscillation direction of the oscillating member 13 and indicates that the oscillating member 13 has reached a first end-of-stroke absolute angular position, corresponding to a first end-of-stroke radial position of the cup retention members 8 and, consequently, either the minimum or the maximum dimension of the retention area A of the cups 2, and a second rotation direction inversion of the permanent magnet 25, which is caused by an inversion in the oscillation direction of the oscillating member 13 and indicates that the oscillating member 13 has reached a second end-of-stroke absolute angular position, opposite the first one, corresponding to a second end-of-stroke radial position of the cup retention members 8 and, consequently, the other between the minimum and maximum dimensions of the retention area A of the cups 2, determine the initial absolute angular position of the permanent magnet 25, which it assumes when the electric actuator 9 is electrically energized, and the first and second final absolute angular positions of the permanent magnet 25 corresponding to the first and second end-of-stroke absolute angular positions of the oscillating member 13, determine the range of the stroke or angular travel of the oscillating member 13 in response to a complete rotation of the wheel 11 based on, in particular as absolute value of the difference between, the first and the second final absolute angular positions of the permanent magnet 25 corresponding to the first and end-of-second stroke final absolute angular positions of the oscillating member 13, and determine the initial configuration of the cup holder 1 and, therefore, the initial dimension of the retention area A when the cup holder 1 is mounted, based on the angular displacement of the permanent magnet 25 from the initial absolute angular position to the first final absolute angular position corresponding to the first oscillation inversion of the oscillating member 13, and the determined range of the stroke or angular travel of the oscillating member 13.

In a different embodiment, instead of electrically energizing the electric actuator 9 in order to cause the oscillating member 13 to perform an entire stroke or angular travel in response to a complete rotation of the wheel 11, so as to cause it to reach the first and the second end-of-stroke absolute angular positions, based on which the range of the stroke or angular travel of the oscillating member 13 in response to a complete rotation of the wheel 11 is then determined, the range of the stroke or angular travel of the oscillating member 1 can be stored in the electronic control unit 24 and the electric actuator 9 can be electrically energized only until the electronic control unit 24 detects the first rotation direction inversion of the permanent magnet 25.

In this embodiment, therefore, only the initial absolute angular position of the permanent magnet 25, which it assumes when the electric actuator 9 is electrically energized, and the first final absolute angular position of the permanent magnet 25 corresponding to the first end-of-stroke absolute angular position of the oscillating member 13, which it assumes when the first oscillation direction inversion of the oscillating member 13 is detected, are determined; the initial configuration of the cup holder 1 is therefore determined based on the angular displacement of the permanent magnet 25 from the initial absolute angular position to the first final absolute angular position corresponding to the first oscillation inversion of the oscillating member 13, and the stored range of the stroke or angular travel of the oscillating member 13.

The electronic control unit 24 can further be programmed to:

determine the number of teeth of the gear 29 corresponding, according to the pitch therebetween, to an angular displacement nearer to the one of the permanent magnet 25 from the initial absolute angular position to the first final absolute angular position, and determine the angular displacement of the permanent magnet 25 from its initial absolute angular position to the first final absolute angular position based on the determined number of teeth of the gear 29 and the pitch therebetween.

Lastly, the electronic control unit 24 is programmed to adjust the dimension of the retention area A to adapt it to the dimension of the cup 2 to be used based on the initial dimension of the retention area A when the cup holder 1 is mounted and on the pitch between the teeth of the gear 29.

The invention claimed is:

1. A cup holder designed to be mountable in a beverage vending machine to support an individual cup in a filling station and/or in a picking station; the cup holder having a vertical axis, the cup holder comprising:

a cup retention device, which defines a cup retention area intended to be occupied by a cup when the cup is supported by the cup retention device;

wherein the cup retention device comprises a plurality of cup retention members mounted to be slidable in respective radial directions relative to the axis so as to adapt a dimension of the cup retention area to a dimension of the cup to be supported; and an electric actuator and a transmission designed to kinematically connect the electric actuator to the cup retention members and transform a rotary motion of the electric actuator into a simultaneous linear motion of the cup retention members in the respective radial directions, wherein the transmission comprises a crank and slotted link comprising a wheel with a rotation axis parallel to said axis and designed to receive a rotary motion from the electric actuator, and an intermediate member arranged between the wheel and the cup retention members and provided with a slot engaged by a pin integral to the wheel to transform the rotary motion of the wheel into a reciprocating motion of the intermediate member relative to said axis.

2. The cup holder of claim 1, wherein the intermediate member has a curvilinear shape coaxial to the axis, extends over a plane perpendicular to the axis and is kinematically coupled to the cup retention members to transform its own reciprocating oscillatory motion around the axis into a simultaneous reciprocating rectilinear motion of the cup retention members in the respective radial directions.

3. The cup holder of claim 2, wherein each cup retention member comprises a guide sliding block, which extends in a radial direction relative to the axis, and a circular arc-shaped cup engaging portion which delimits, with the cup engaging portions of the other cup retention members, said cup retention area; the intermediate member has a plurality of slots, each of which is slidably engaged by a pin carried by a respective guide sliding block and is designed to transform the rotary motion of the intermediate member into a radial linear motion of the respective cup retention member.

4. The cup holder of claim 1, further comprising a housing to support the cup retention device, the transmission and the electric actuator; the cup holder further comprises a quick engagement/disengagement device designed to enable an easy and quick mounting and dismounting, with few and simple operations, of the electric actuator to/from the rest of the cup holder.

5. The cup holder of claim 4, wherein the transmission comprises a power input coupled to a power output of the electric actuator; the quick engagement/disengagement device is designed to allow the power input and the power output to be quickly coupled and uncoupled when the electric actuator is mounted and dismounted to/from the rest of the cup holder.

6. The cup holder according to claim 5, wherein the housing comprises an upper half-shell and a lower half-shell coupled to one another; the transmission is housed between the upper half-shell and the lower half-shell, and the power input is arranged on the upper half-shell; the electric actuator is dismountably mounted on the upper half-shell.

7. The cup holder of claim 6, wherein the quick engagement/disengagement device comprises a bayonet coupling and a lever release mechanism designed to be manually operated by an operator and move from a locking configuration, in which the electric actuator is prevented from being removable from the housing, to a release configuration, in which the electric actuator is enabled to be movable relative to the housing to disengage the bayonet coupling.

8. The cup holder of claim 7, wherein the bayonet coupling comprises a lug carried by a bottom wall of the electric actuator, and a groove in the upper half-shell of the housing and shaped so as to be crossed by the lug during mounting and dismounting of the electric actuator to cause the bayonet coupling to be locked and, respectively, unlocked.

9. The cup holder according to claim 8, wherein the groove comprises a vertical segment designed to be crossed by the lug as a result of a movement of the electric actuator in a direction parallel to the axis, and a horizontal segment designed to be crossed by the lug as a result of a rotation of the electric actuator around an axis parallel to the axis.

10. The cup holder of claim 7, wherein the lever release mechanism comprises a pin, which is slidably mounted through an upper wall of the upper half-shell in a direction parallel to the axis and, when the actuator is mounted on the top half-shell, it engages a hole in the bottom wall of a casing of the electric actuator; the lever release mechanism further comprises an actuation lever, which is appropriately coupled to the pin so as to drive the pin in response to a manual operation of the actuation lever by an operator.

11. The cup holder of claim 10, wherein the lever is mounted so as to be manually movable from a normal rest position, in which the lever is kept in a raised position by elastic means and the pin protrudes from the upper wall of the upper half-shell and engages the hole, to a release position, in which the lever is lowered to such an extent as to cause the pin to fail to protrude beyond the upper wall so as to free the hole and result in the bayonet coupling being disengageable and the electric actuator being removable.

12. A cup holder designed to be mountable in a beverage vending machine to support an individual cup in a filling station and/or in a picking station; the cup holder having a vertical axis, the cup holder comprising:

a cup retention device, which defines a cup retention area intended to be occupied by a cup when the cup is supported by the cup retention device, wherein the cup retention device comprises a plurality of cup retention members mounted to be slidable in respective radial directions relative to the axis so as to adapt a dimension of the cup retention area to a dimension of the cup to be supported, and wherein the cup retention members are operated by an electric actuator to slide in said respective radial directions;

the cup holder further comprises a transmission, which kinematically connects the electric actuator to the cup retention device, and comprises an oscillating member coaxial to the axis and coupled to the electric actuator via a kinematic linkage designed to transform a rotary motion received from the electric actuator into a reciprocating oscillatory motion of the oscillating member around the axis, and coupled to the cup retention members via a kinematic linkage designed to transform the reciprocating oscillatory motion of the oscillating member into a simultaneous reciprocating rectilinear motion of the cup retention members in the respective radial directions;

the cup holder further comprises an electronic control system to control movement of the cup retention members and, consequently, the dimension of the cup retention area;

the electronic control system comprises:

a sensory system mounted and configured so as to generate an electric output such as to allow the dimension of the cup retention area to be determined; and an electronic control unit electrically connected to the sensory system to receive the electric output thereof, and to the electric actuator to supply electric control signals thereto and programmed to control, based on the electric output of the sensory system, the electric actuator to adapt the dimension of the cup retention area to the dimension of the cup to be supported by moving the cup retention members;

the sensory system comprises a magnetic angular position sensor device mounted and designed to provide an electrical output indicative of the absolute angular position of the oscillating member and, consequently, of the absolute radial position of the cup retention members;

the magnetic angular position sensor device comprises:

an axially magnetised permanent magnet with a magnetization axis and mounted to rotate about a rotation axis perpendicular to the magnetization axis of the permanent magnet in response to a rotation of the oscillating member; and a magnetic angular position sensor arranged in a fixed position close to the permanent magnet so as to provide an electric output indicative of the angular position of the magnetic field generated by the permanent magnet.

13. The cup holder according to claim 12, wherein the magnet is a cylindrical magnet carried by a shaft of a gear mounted to rotate about the rotation axis, which is parallel to the axis, and meshing with a toothed sector formed along an edge of the oscillating member.

14. The cup holder according to claim 13, wherein the electronic control unit is further programmed to determine the initial configuration of the cup holder defined by the initial dimension of the cup retention area when the cup holder is mounted.

15. The cup holder according to claim 14, wherein to determine the initial configuration of the cup holder, the electronic control unit is further programmed to:

determine, based on the electric output of the magnetic angular position sensor, the current absolute angular position of the magnet, electrically energize the electric actuator until, based on the current absolute angular position of the magnet, the electronic control unit detects:

a first rotation direction inversion of the magnet, which is caused by an oscillation direction inversion of the oscillating member and indicates that the oscillating member has reached a first end-of-stroke absolute angular position, to which a first end-of-stroke radial position of the cup retention members corresponds and, consequently, either a minimum or a maximum dimension of the cup retention area of the cups, and a second rotation direction inversion of the magnet, which is caused by a further oscillation direction inversion of the oscillating member and indicates that the oscillating member has reached a second end-of-stroke absolute angular position, opposite the first one, to which a second end-of-stroke radial position of the cup retention members corresponds and, consequently, the other one between the minimum and maximum dimensions of the cup retention area of the cups, determine the initial absolute angular position of the magnet, which it assumes when the electric actuator is electrically energized, and the first and second absolute angular positions of the magnet corresponding to the first and second end-of-stroke absolute angular positions of the oscillating member, determine the range of the travel or angular stroke of the oscillating member in response to a complete rotation of the wheel based on the difference between the first and the second absolute angular positions of the magnet corresponding to the first and second end-of-stroke absolute angular positions of the oscillating member, and determine the initial configuration of the cup holder based on the angular displacement of the magnet from the initial absolute angular position to the first final absolute angular position corresponding to the first end-of-stroke absolute angular position of the oscillating member, and the determined range of the travel or angular stroke of the oscillating member.

16. The cup holder according to claim 14, wherein to determine the initial configuration of the cup holder, the electric control unit is further programmed to:

store the range of the travel or angular stroke of the oscillating member in response to a complete rotation of the wheel, determine, based on the electric output of the magnetic angular position sensor, the current absolute angular position of the magnet, electrically energize the electric actuator until, based on the current absolute angular position of the magnet, the electronic control unit detects:

a first rotation direction inversion of the magnet, which is caused by an oscillation direction inversion of the oscillating member and indicates that the oscillating member has reached a first end-of-stroke absolute angular position, to which a first end-of-stroke radial position of the cup retention members corresponds and, consequently, either the minimum or the maximum dimension of the cup retention area of the cups, determine the initial absolute angular position of the magnet, which it assumes when the electric actuator is electrically energized, and the first absolute angular position of the magnet corresponding to the first end-of-stroke absolute angular position of the oscillating member, and determine the initial configuration of the cup holder based on the angular displacement of the magnet from the initial absolute angular position to the first final absolute angular position corresponding to the first end-of-stroke absolute angular position of the oscillating member, and the stored range of the travel or angular stroke of the oscillating member.

* * * * *